United States Patent
Laferriere et al.

(10) Patent No.: US 7,444,519 B2
(45) Date of Patent: Oct. 28, 2008

(54) ACCESS CONTROL FOR FEDERATED IDENTITIES

(75) Inventors: Leo Laferriere, Woburn, MA (US); Sharon Chang, Newton, MA (US); Ravi Kumar Gudipati, Maynard, MA (US); Prateek Mishra, Newton, MA (US)

(73) Assignee: Computer Associates Think, Inc., Islandia, NY (US)

( * ) Notice: Subject to any disclaimer, the term of this patent is extended or adjusted under 35 U.S.C. 154(b) by 60 days.

(21) Appl. No.: 10/947,893

(22) Filed: Sep. 22, 2004

(65) Prior Publication Data

US 2005/0188212 A1    Aug. 25, 2005

Related U.S. Application Data

(60) Provisional application No. 60/505,542, filed on Sep. 23, 2003.

(51) Int. Cl.
  H04K 1/00    (2006.01)
  H04Q 7/38    (2006.01)
  G06F 7/00    (2006.01)
  G06F 21/20   (2006.01)

(52) U.S. Cl. .............................. 713/185; 726/5; 726/8; 726/9

(58) Field of Classification Search ................ 713/185, 713/168; 726/2, 27, 9, 20, 4
See application file for complete search history.

(56) References Cited

U.S. PATENT DOCUMENTS

| 2003/0041240 A1 * | 2/2003 | Roskind et al. ............. 713/168 |
| 2004/0128393 A1 * | 7/2004 | Blakley et al. ............. 709/229 |
| 2005/0262343 A1 * | 11/2005 | Jorgensen et al. .......... 713/168 |

FOREIGN PATENT DOCUMENTS

WO    WO 03065754 A1 *    7/2003

OTHER PUBLICATIONS

Arshad Noor, Securing the core with an Enterprise Key Management Infrastructure (EKMI), Mar. 2008, IDtrust '08: Proceedings of the 7th symposium on Identity and trust on the Internet, pp. 98-111.*

* cited by examiner

*Primary Examiner*—Matthew B Smithers
*Assistant Examiner*—Courtney D Fields
(74) *Attorney, Agent, or Firm*—Baker Botts L.L.P.

(57) ABSTRACT

An authentication process in a network environment provides a remote user with secured access to an enterprise network based on recognition of a third-party security token. The method includes authenticating the user against a plurality of third-party security tokens, wherein the third-party security tokens originate from a range of different partner home sites. The remote user, prior to obtaining secured access to the enterprise network, is not known to the enterprise network, and does not need to be associated with any security tokens previously originating from the enterprise network. The enterprise network is provided with the ability to rely upon third-party security tokens to authenticate the remote user.

44 Claims, 5 Drawing Sheets

ACCESS CONTROL FOR FEDERATED IDENTITIES

RELATED APPLICATION

This application claims priority to, and the benefit of, U.S. Provisional Application No. 60/505,542, filed Sep. 23, 2003, for all subject matter common to both applications. The disclosure of said provisional application is hereby incorporated by reference in its entirety.

FIELD OF THE INVENTION

The present invention relates to the provision of secured access by users to resources controlled by an enterprise. Secured access is provided to users who have not been authenticated by the enterprise by authenticating the users based on security tokens issued by third parties that are not the enterprise but are related to the enterprise.

BACKGROUND OF THE INVENTION

Traditionally, access control systems have allowed secured access to enterprise resources such as web pages, files, applications and web services by maintaining lists of users who have a prior relationship to the enterprise (customers, employees) and their credentials, together with a list of resources that each user (or groups of users) are entitled to use.

Increasingly, enterprises are required to provide services to users who do not have a direct or prior relationship with the enterprise, but instead have a direct or prior relationship with third-party partner enterprises. One way to support this type of business relationship is to have partners issue security tokens to their known users that can then be used as a means of authentication at the target enterprise. This flexible concept of identity, wherein users originating from one enterprise can authenticate at a second enterprise, is known as "identity federation".

However, providing such third-party users controlled access to resources is a challenging problem. The identity of the user is not known in advance, so it is not possible to maintain an access control list indicating which of the resources the particular user should be allowed to access. Additionally, the authentication method relevant to a user is not known when the user attempts to access a resource. Therefore, the user must be consulted on the authentication method that they desire to use.

Individuals have multiple sources of identity on the internet. Some identities can be correlated with accounts at public portals, such as Yahoo® or Earthlink®, while other identities are correlated with a person's workplace, or at financial institutions where a user has an account. These identity repositories maintain user information and manage credentials. The repositories are capable of acting as sources of trust. The concept of affiliation involves leveraging the identities of users to enable users to utilize resources, or perform transactions, securely at sites other than their site of origin.

Information about users is communicated from the origin site to the site providing services using a number of different technologies. One example technical standard, Security Assertion Markup Language (SAML), defines an XML framework for exchanging authentication and authorization information between enterprises or web sites. SAML is a standard currently from OASIS.

One application of SAML is to support the secure transfer of an authenticated identity from one enterprise to another when users are utilizing a standard commercial browser. The SAML Web browser profile for Single Sign-On, Prateek Mishra, et, al, The OASIS SSTC SAML Bindings and Profile Specification, describes a known canonical sequence of Hyper Text Transfer Protocol (HTTP) exchanges that convey SAML assertions from a home or source site to a site providing services, i.e., a content site or destination site. A user may use the described protocol to authenticate at their home site and utilize services from other sites in a secure fashion. One of ordinary skill in the art will appreciate that the terms home site and source site are interchangeable as utilized herein, and that the terms content site and destination site are likewise interchangeable as utilized herein. The different terminology stems from different protocols, however the concept of home or source and content or destination are substantially the same.

Another example technology for providing secure user information is Microsoft Passport®, made by the Microsoft Corporation of Redmond, Wash. MS Passport® is a proprietary identity repository controlled and managed by Microsoft Corporation. Identity information in Passport® is transferred as an encrypted string on the URL line from the Passport site to the service provider site. Microsoft Corporation has provided Application Program Interfaces (APIs) that enable third-party software to read the information conveyed by the URL.

There can be a number of additional protocols involving the use of "tokens" to carry user information for use in inbound affiliation. AOL has announced an initiative called "Magic Carpet" with roughly the same goals as Passport. The Liberty Alliance Project is defining a "universal open standard for single sign-on". This effort may yield yet another token format and protocol for communicating identity across enterprises.

Traditionally, directory synchronization, use of meta-directories or bulk upload of user information from one site to another has been utilized as a technique to solve the remote authentication problem. These techniques are effective within a single administrative zone and with a small number of user stores. They pose security hazards in that sensitive data such as passwords may be unnecessarily exposed to administrators and system administrators. They do not scale beyond a small number of user stores.

SUMMARY OF THE INVENTION

There is a need for a method for providing secured access in a network environment based at least in part on third-party security information. In accordance with one embodiment of the present invention, in a network environment, an enterprise network receives a request for secured access from a user. The user is authenticated using a security token issued by a third-party that is not the enterprise network. Secured access is provided to the user upon confirmation of authentication.

In accordance with aspects of the present invention, receiving a request includes the user requesting access to a content site within the enterprise network. The process of fulfilling the request can include the obtaining and use of the third-party security token, or may not include the obtaining and use of the third-party token.

In accordance with further aspects of the present invention, when there is no third-party token, the user is queried as to which of a plurality of authentication methods is to be used for authentication of the user, such as which authentication site is to be used. The user can designate which of a plurality of authentication methods, such as which site is to be used for authentication of the user, resulting in the possible use of a third-party security token authentication method for authentication of the user. The user can be forwarded to a partner site to obtain the third-party security token for authentication.

In accordance with further aspects of the present invention, providing secured access includes linking the user to the content site upon confirmation of authentication based on a direct mapping method. The direct mapping method can include identifying the user by searching and obtaining a key known at a home site and the content site; and upon verification of the authentication, linking the remote user to a directory entry hosted at the content site.

In accordance with further aspects of the present invention, providing secured access includes linking the user to the content site upon confirmation of authentication based on an indirect mapping method. The indirect mapping method can include identifying the user by searching and obtaining a key known at the content site; receiving at least one user entry corresponding to identification of the user; and upon verification of the authentication, creating an entry for and linking the remote user to a secondary profile hosted at the content site.

In accordance with further aspects of the present invention, providing secured access includes linking the user to the content site upon confirmation of authentication based on a user registration method. The user registration method can include the user presenting the third-party security token to the content site; processing the third-party security token to verify its source; mapping the user to a default directory entry; presenting a form to the user prompting collection of information about the user; and upon verification of the authentication, linking the remote user to a secondary profile hosted at the content site.

The third-party security token can be in the form of at least one of a SAML assertion, a Passport token, and an alternate third-party security token.

In accordance with further aspects of the present invention, providing secured access includes mapping the third-party security token presented by the user into a directory entry local to the enterprise network; and implementing rules-based access control at the enterprise network. Mappings are created based on at least one of a user DN present in the third-party security token and attribute values carried in the third-party security token.

In accordance with one embodiment of the present invention, in a network environment, a system for providing secured access includes an enterprise network receiver for receiving a request for secured access from a user. An authenticator is configured to authenticate the user using a security token issued by a third-party that is not the enterprise network. An access provider provides secured access to the user upon confirmation of authentication.

In accordance with aspects of the present invention, the request is directed to a content site within the enterprise network. The process of fulfilling the request can include the obtaining and use of the third-party security token, or may not include the obtaining and use of the third-party security token. The third-party security token is issued by a third-party for authentication.

In accordance with further aspects of the present invention, secured access includes a link of the user to the content site upon confirmation of authentication based on a direct mapping method. Secured access can alternatively include a link of the user to the content site upon confirmation of authentication based on an indirect mapping method. In further alternative, secured access can include a link of the user to the content site upon confirmation of authentication based on a user registration method. In each instance, secured access can be further implemented using rules-based access control at the enterprise network based upon the content of the third-party security token.

In accordance with one embodiment of the present invention, a medium for use in a network environment on an electronic device is provided. The medium holds instructions executable using the electronic device for performing a method of providing secured access. The method includes an enterprise network receiving a request for secured access from a user. The user is authenticated using a security token issued by a third-party that is not the enterprise network. Secured access is provided to the user upon confirmation of authentication.

BRIEF DESCRIPTION OF THE DRAWINGS

The present invention will become better understood with reference to the following description and accompanying drawings, wherein.

DETAILED DESCRIPTION

Figure 1:
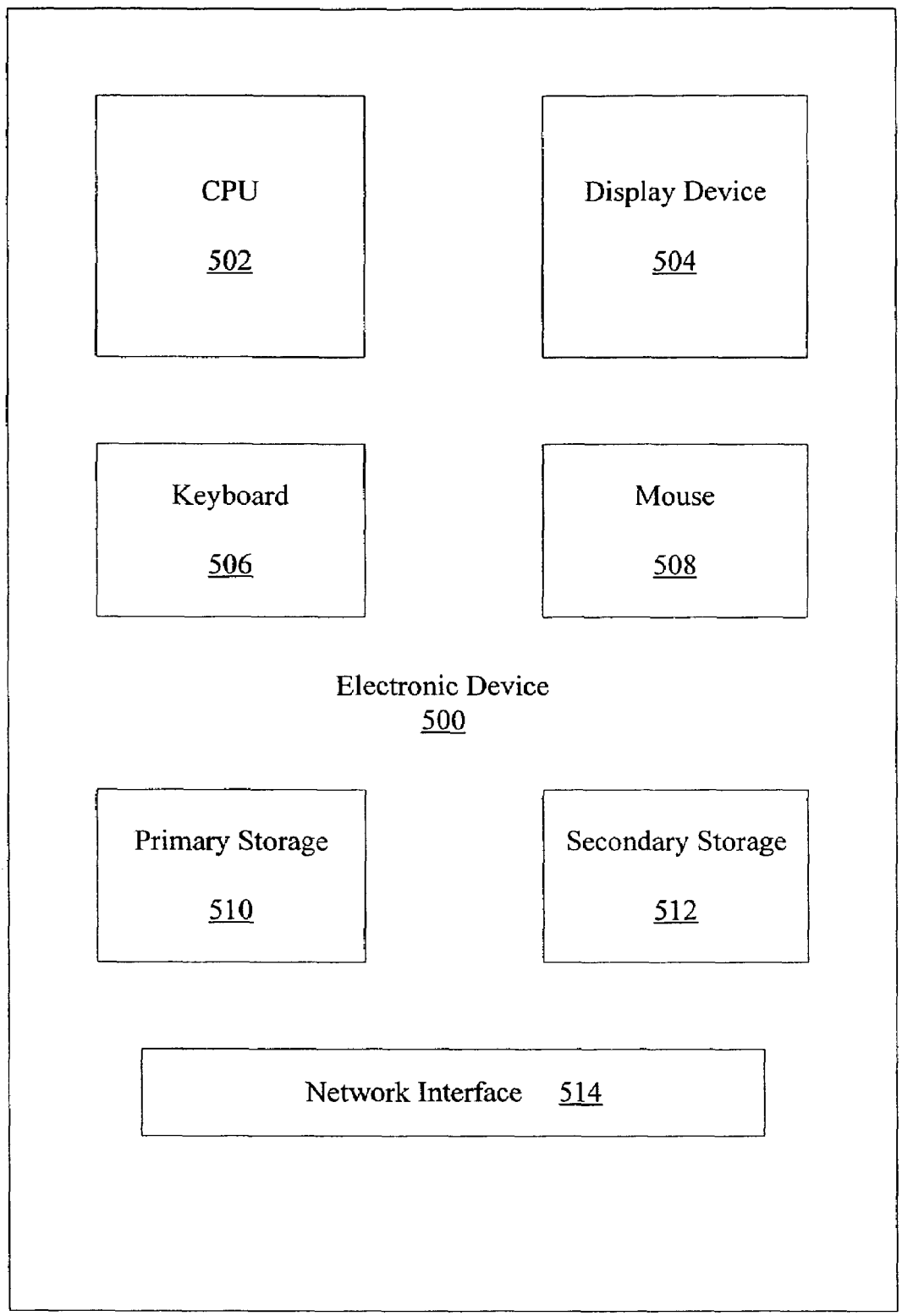
FIG. 1 is a diagrammatic illustration of an electronic device that can be utilized to execute a method performed in an embodiment of the present invention.

The following description provides an example embodiment of an authentication process according to the present invention. In a network environment, the system and method of the present invention provides a remote user with secured access to an enterprise network based on recognition of a third-party security token. The method includes authenticating the user against a plurality of third-party security tokens, wherein the third-party security tokens originate from a range of different partner home sites. The remote user, prior to obtaining secured access to the enterprise network, is not known to the enterprise network, and does not need to be associated with any security tokens previously originating from the enterprise network. Rather, the enterprise network is provided with the ability to rely upon third-party security tokens to authenticate the remote user.

FIGS. 1 through 5, wherein like parts are designated by like reference numerals throughout, illustrate an example embodiment of a system and method for implementation of an authentication process using third-party security tokens according to the present invention. Although the present invention will be described with reference to the example embodiment illustrated in the figures, it should be understood that many alternative forms can embody the present invention. One of ordinary skill in the art will additionally appreciate different ways to alter the parameters of the embodiments disclosed, such as variations in the elements or implementations, in a manner still in keeping with the spirit and scope of the present invention. Furthermore, the present invention anticipates use with a variety of different security applications.

Prior to discussing the details and aspects of the present invention, it should be noted that the following terms and phrases have the corresponding meanings as utilized herein and generally defined below:

Local Users: A set of users is said to be local to a site X, if the site manages their credentials (e.g., passwords, certificates) and their primary profile (i.e., set of attributes) and acts as a definitive authority for user membership at site X.

Remote Users: A set of users is said to be remote to a site Y, if their credentials and primary profiles are managed using a security system different from that employed at said site. Typically, remote users are also administered by an enterprise or department distinct from the entity administering site Y.

Content Site: A site that utilizes security products to secure its contents (e.g., web pages, applications) based upon policy driven access control. It also manages a set of local users. A content site allows access to both local and remote users. For remote users, it may also maintain a secondary profile (i.e., additional set of attributes).

Content-Only Site: A Site that utilizes security products to secure its contents (e.g., web pages, applications) based upon policy driven access control. It does not manage a set of local users. A content-only site allows access to remote users only. For remote users, it may also maintain a secondary profile (i.e., additional set of attributes).

Home Site: A home site manages credentials and (primary) profiles of a set of users. It utilizes some well-known protocol (e.g., Passport, SAML web browser profiles) to communicate security information about users to other sites. Home sites may optionally utilize security products.

Web Browser SSO Profiles for SAML: A standard family of protocols which describe how unrelated sites can securely communicate SAML assertions from one site to another via the user browser. There are two such profiles: browser/artifact profile and the browser/post profile.

The present invention relates to a family of techniques that taken together provide technology that allows secured access to third-party users. The techniques include the ability to specify and enforce a security policy called "Multiple Authentication Scheme" for resources. This allows system administrators to set policies for a single resource such that it can be accessed using name and password login (local to the enterprise), SAML assertions generated by any one of a number of partners, or other third-party security tokens originating from other partners.

When the user attempts to access the resource, the method of the present invention involves interaction with the user and offers choices between the policy-specified authentication methods. The user selects a preferred authentication method, and is then either presented with the local authentication method or is aided in interacting with a partner to obtain a third-party security token using a known protocol (e.g., SAML web browser profile or Passport protocol). In accordance with example embodiments of the present invention, the preferred authentication method relates to the choice of authentication site, and the corresponding method for use of the selected site.

In accordance with one example embodiment of the present invention, the inventive method provides the function of flexibly mapping third-party security tokens presented by users into an entry in a directory or user list local to the enterprise. Such an entry acts as a "virtual user" and traditional access control machinery can be used to control access (using, for example, role-based access control) extending the enterprise access control model to users presenting credentials from third-party sites.

Accordingly, the present invention allows security administrators to create mappings based on the content of third-part security tokens. For example, the mapping may be based upon a User Distinguished Name (DN) present in the third-party security token (SAML, Passport), or attribute values carried in the third-party security token (SAML, Passport).

FIG. 1 illustrates one example embodiment of an electronic device 500 suitable for practicing the illustrative embodiments of the present invention. The electronic device 500 is representative of a number of different technologies, such as personal computers (PCs), laptop computers, workstations, personal digital assistants (PDAs), Internet appliances, cellular telephones, and the like. In the illustrated embodiment, the electronic device 500 includes a central processing unit (CPU) 502 and a display device 504. The display device 504 enables the electronic device 500 to communicate directly with a user through a visual display. The electronic device 500 further includes a keyboard 506 and a mouse 508. Other potential input devices not depicted include a stylus, trackball, joystick, touch pad, touch screen, and the like. The electronic device 500 includes primary storage 510 and secondary storage 512 for storing data and instructions. The storage devices 510 and 512 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 510 and 512. The electronic device 500 can also include a network interface 514 for communicating with one or more electronic devices external to the electronic device 500 depicted. A modem is one form of network interface 514 for establishing a connection with an external electronic device or network. The CPU 502 has either internally, or externally, attached thereto one or more of the aforementioned components.

It should be noted that the electronic device 500 is merely representative of a structure for implementing various aspects of the present invention. However, one of ordinary skill in the art will appreciate that the present invention is not limited to implementation on only the described device 500. Other implementations can be utilized, including an implementation based partially or entirely in embedded code, where no user inputs or display devices are necessary. Rather, a processor can communicate directly with another processor or other device.

Figure 2:
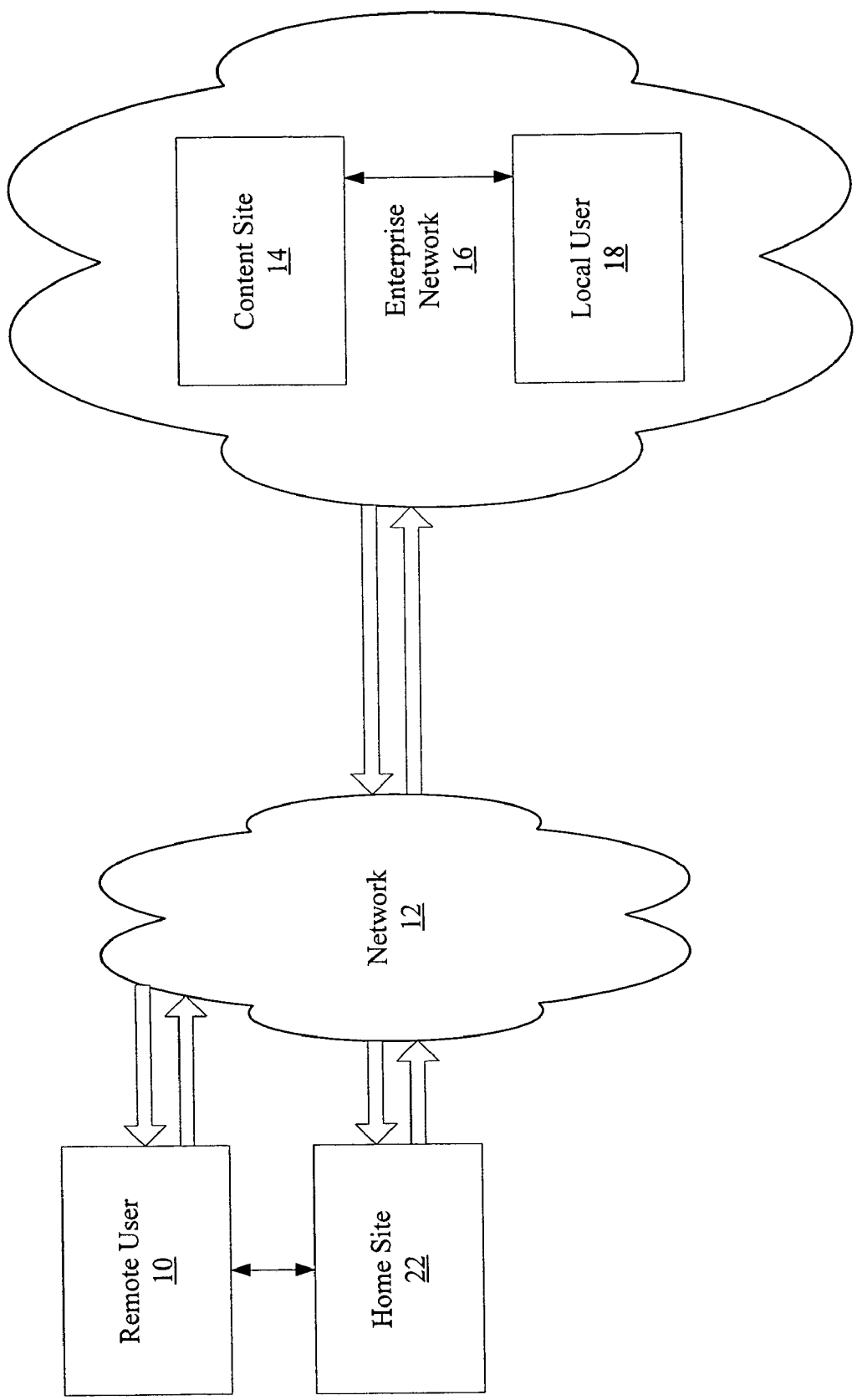
FIG. 2 is a diagrammatic illustration of a configuration suitable for implementing a method of authentication, in accordance with one embodiment of the present invention.

FIG. 2 is a diagrammatic illustration showing some key components that support the ability of a remote user to access a content site. A remote user 10 is in communication with a network 12. The network can have a number of different forms, including for example, the world wide web. A content site 14 is resident within its own enterprise network 16. Also included within the enterprise network 16 can be a local user 18. The last component required to demonstrate and describe the method of the present invention is a third-party provider, such as a partner that is distributed from the content site 14. The remote user 10 can have its security measures operated by a separate home site 22, if desired.

It should further be noted that the remote user 10 as referred to herein can be an individual, a group of individuals, an electronic device, any combination of the aforementioned, and the like. Accordingly, the present invention does not rely on the user being an actual individual, but rather, a user in the context of the present invention is merely an entity providing a request as detailed below.

In FIG. 2, the remote user 10, the content site 14, the local user 18, and the home site 22 are most frequently implemented using some form of electronic device, such as that which is described and shown in FIG. 1. The remote user 10 in the example embodiment can interactively communicate with the network 12. Likewise, the home site 22 can interactively communicate with the network 12. Furthermore, the enterprise network 16 (including the content site 14 and the local user 18) can interactively communicate with the network 12. Based on such a configuration, the remote user 10 can effect communication with the home site 22 and the content site 14 through the network 12. Likewise, if desired, the content site 14 can also communicate with the home site 22 through the network 12, although such communication is not required to carry out the method of the present invention.

In fact, one of ordinary skill in the art will appreciate that the above-described configuration of users, content sites, networks, and partners, is merely one example representation of how each of these parties may interact. The remote user 10 can be more remotely located, or more closely located, to the content site 14. The home site 22 can likewise have multiple additional layers of networks and communication couplings, or fewer. There is no need for the local user 18, or there can be numerous more local users 18. The content site 14 can be located within its own enterprise network 16 as shown, or can be located in an internet network, or not in its own sub-network at all, as long as the content site 14 can be communicated with by the remote user 10. There are numerous other variations and combinations of each of the identified parties illustrated and described, such that the present invention is by no means limited to the illustrative embodiment of FIG. 2. However, FIG. 2 will be relied upon herein as a vehicle for clearly describing aspects of the present invention.

Figure 3:
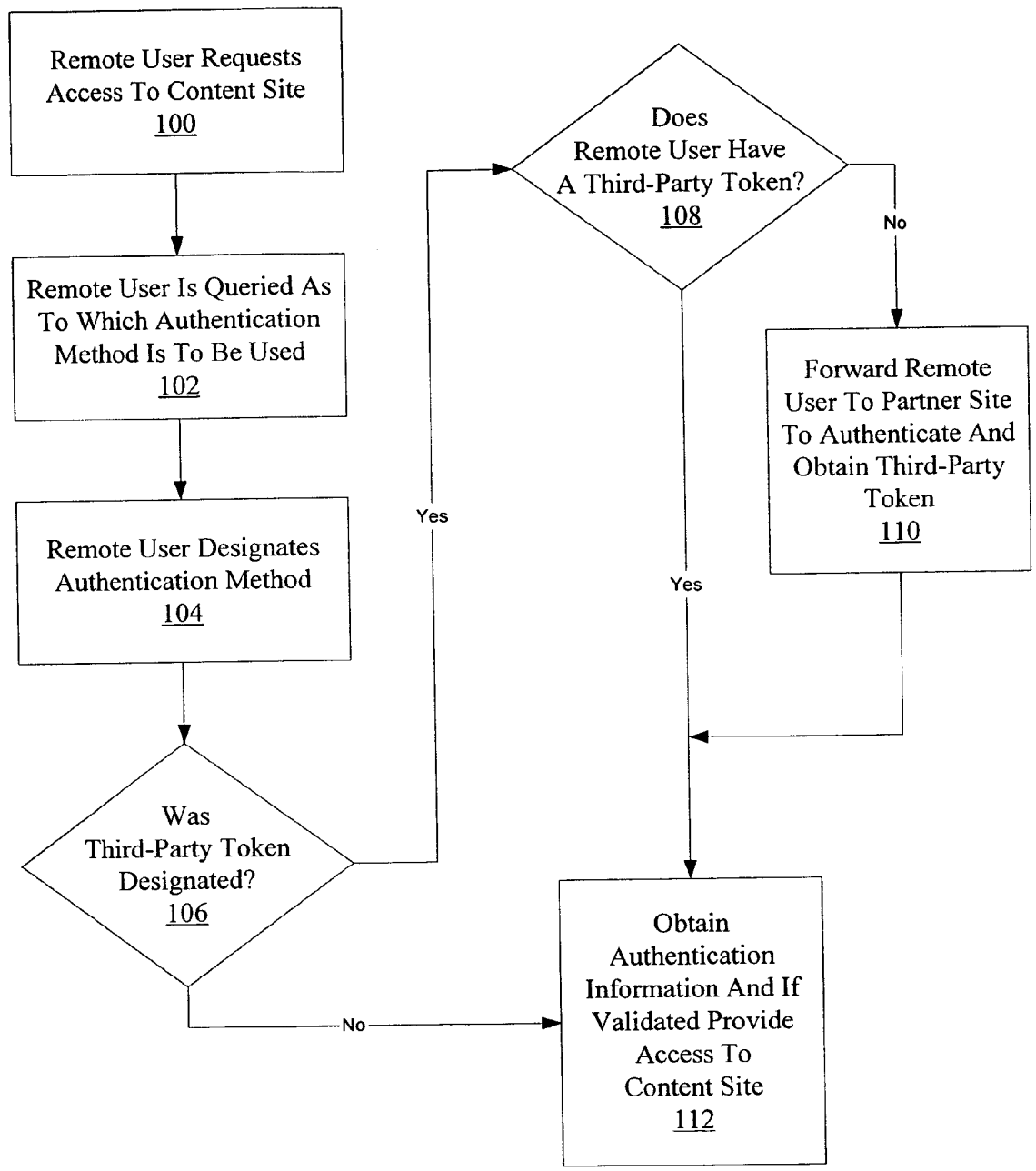
FIG. 3 is a flowchart illustrating the method of authentication, in accordance with one embodiment of the present invention.

FIG. 3 is a flowchart illustrating one implementation of the method of the present invention. Prior to gaining entry to the content site 14, the remote user 10 requests access (step 100). The remote user 10 is queried as to which authentication method, and corresponding authentication site, is to be used to authenticate the remote user 10 (step 102). In certain instances, the remote user 10 may offer this information upon submitting the request for access, thereby circumventing this step. The remote user 10 designates which authentication method the remote user 10 will utilize to authenticate. The remote user 10 can choose between providing a username and password, and providing a third-party security token from the home site 22. If the username and password method are designated, the remote user 10 proceeds directly to the last step. If the third-party security token method is designated, the remote user 10 is queried as to whether the remote user 10 has a third-party security token, or whether one is needed (step 108). If the remote user 10 requires a third-party security token, the remote user 10 is forwarded to the home site 22 to authenticate and obtain a third-party security token (step 110). When the remote user 10 has the third-party security token, or if the remote user 10 previously indicated that a third-party security token would not be utilized, the content site obtains the authentication information from the remote user 10 and if validated, provides access to the content site 14.

Figure 4:
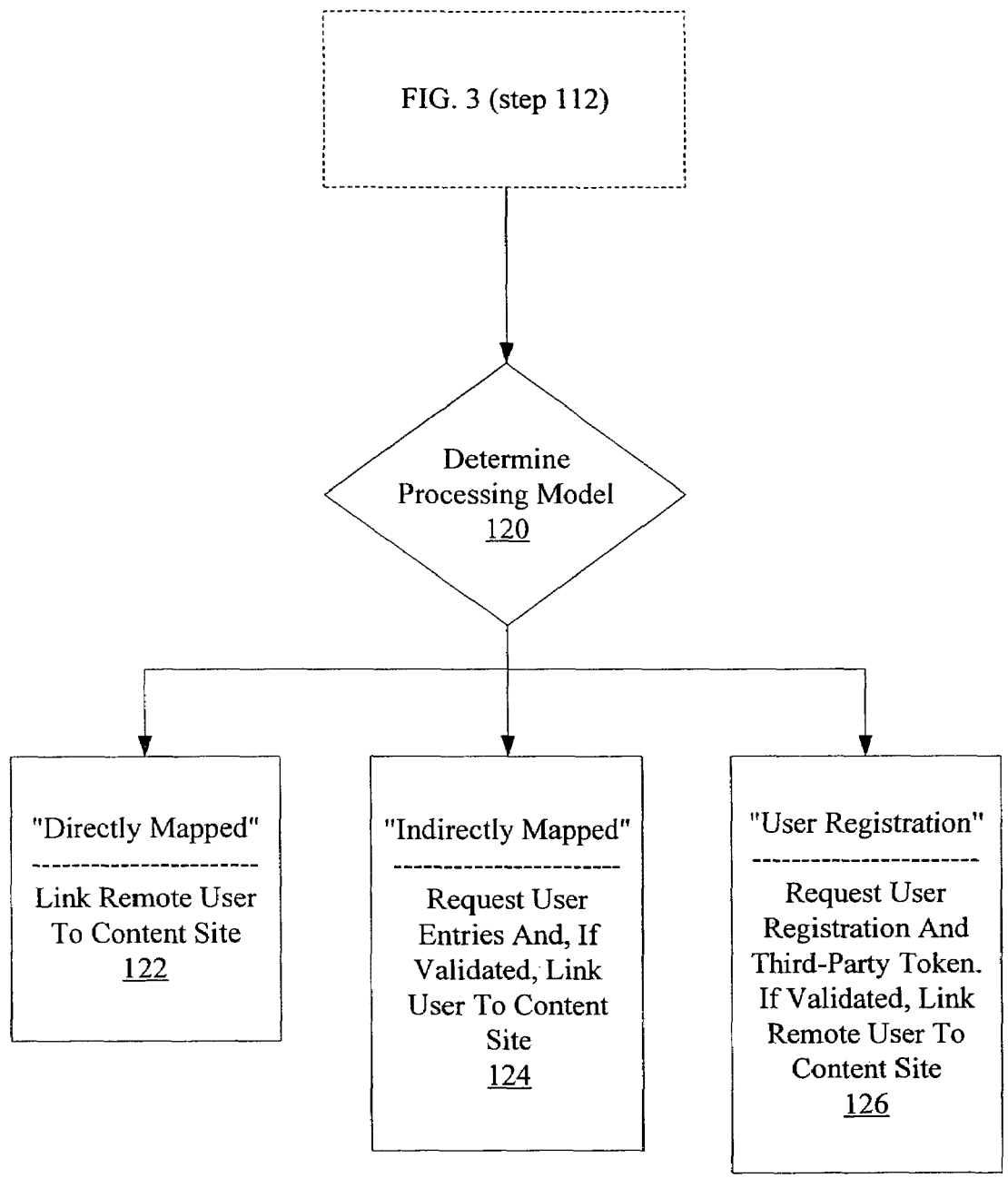
FIG. 4 is a flowchart illustrating different processing methods, in accordance with aspects of the present invention.

The process for obtaining the authentication information from the remote user 10 is shown in more detail in FIG. 4. To obtain the requisite authentication information, the specific processing model to be utilized is determined (step 120). The processing model can be one of three different options, namely, directly mapped, indirectly mapped, and user registration.

In the instance of a directly mapped processing model, the remote user 10 is known at the home site 22 and at the content site 14 through the same key (such as user DN). The remote user 10 is linked to the secondary profile hosted at the content site 14 (step 122). The relevant entry must be found by searching through one or more user directories. If the relevant entry is not found, or if there are multiple entries, additional information is requested from the remote user 10, or access is ultimately denied.

In the instance of an indirect mapping processing model, the remote user 10 is known at the content site 14 but through one or more key values distinct from the user DN. Instead, two user entries are connected through one or more attribute values (e.g., department, title, etc.). If the relevant entries are not found, or if there are multiple entries, additional information is requested from the remote user 10, or access is ultimately denied.

Many users may be tied to a single identity at the content site. For example, secondary profiles and user mappings at the content-site can include: (1) all users from a particular home site are mapped to a single directory entry, (2) all users from all home site with specific similar attributes are mapped to a single directory entry, or (3) all users from all home sites are mapped to a single directory entry.

In the instance of a user registration processing model, the content site 14 is unable to map the remote user 10 to a directory entry. This can include the instances above where additional remote user information is required. The content site 14 can offer the option of user self-registration. In this extension, the remote user 10 presents a Passport, SAML, or other third-party security token to the content site 14, which is processed successfully except that no directory entry is found for the user.

A policy is set such that the remote user 10 is mapped to a default "guest" directory entry. A form is then presented to the remote user 10 and information about the remote user 10 is collected. When the remote user 10 submits the form, back-end systems can collect the relevant data and update the directory so that when the remote user 10 arrives the next time, the appropriate directory entry is in place.

Thus, in accordance with the method of the present invention, when the remote user 10 presents appropriate credentials, the system validates the credentials and provides access to the resource. For example, remote users can provide any one of the following credentials: (a) Login with name and password (local); (b) a third-party security token in the form of a SAML assertion from Partner1, Partner2, . . . , Partner10; or (c) a third-party security token in the form of a Passport token. Other third-party security tokens can also be utilized depending on the configuration of the content site 14.

When a user attempts to access the content site 14, the system offers the available choices for this resource. The user selects one of the authentication methods. There are two cases: (a) the user authenticates locally with name and password and is given access to resources in the traditional way; and (b) the user selects a third-party security token choice and authenticates at a partner site. Subsequently, the user returns with a token and may be given access to a desired resource if the authentication is validated.

When a remote user arrives at a content site for the latter case, some standard token (e.g., Passport information, SAML assertion) is made available from the home site. The token contains information about the authentication act at the home site, as well as information drawn from the primary profile. Notice that Passport always contains a unique PUID (permanent user ID). The user ID is used to tie the user's session at the content provider site to a user identity at the home site. In case of SAML, administrators set the name of this field through the admin GUI.

The home site maps the user ID to a unique user at the site over a reasonable period of time (e.g., several years). Passport guarantees this for the PUID, but for SAML this must be documented as a requirement for SAML home sites.

A specially flexible form of access control which does not require "virtual" directory entries is also supported by the method of the present invention. After token validation, the enterprise access control model is based on attributes provided in the third-party security token that are persisted and made available to the security system. The attributes obtained from the third-party security token are maintained in a session server.

The method of the present invention avoids the explosion of "virtual" directory entries, which may take place in instances such as if Partner1 is sending is a user with attributes:

ManagementLevel: associate, senior, principal
Department: finance, HR, Engineering, Sales, Manufacturing There would already be 3×5=15 entries in the directory system using the methods described above. This technique allows direct writing of rules describing access control in terms of attributes found in the third-party security token.

For example, users originating from Partner1 with ManagementLevel set to senior or principal and Department set to Manufacturing can access file InventoryControl. This provides a much more manageable policy model for the case where access to users originating from partner home sites is differentiated based upon a number of attributes.

Figure 5:
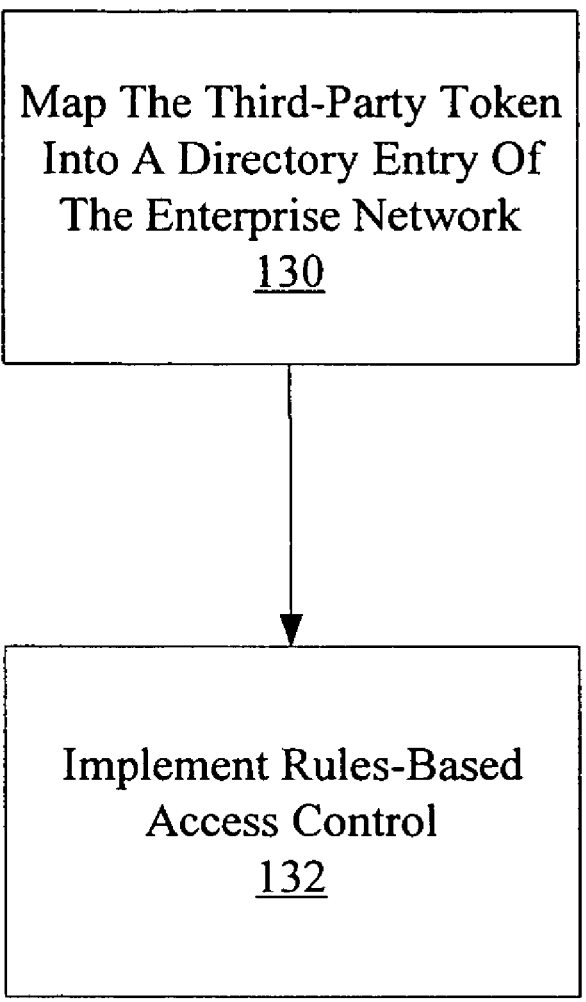
FIG. 5 is a flowchart illustrating mapping of a third-party security token, in accordance with aspects of the present invention.

FIG. 5 is a flowchart illustrating a different aspect of the described embodiment of the present invention. In the network environment, a user is provided with secured access to enterprise network. Specifically, and with regard to the process followed after receipt of the third-party security token, the method can be executed as follows. The third-party security token presented by users is mapped into a directory entry local to the enterprise network (step 130). The directory entry enables implementation of rules-based access control in the enterprise network, thus the method continues with implementing rules-based access control (step 132). The mapping of the third-party security token is carried out based on at least one of a user DN present in the third-party security token and attribute values carried in the third-party security token.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. In a network environment, a method for providing secured access, comprising:
   receiving a request from a user for secured access to an enterprise network;
   in response to the request, interacting with the user to provide the user with an offering of a plurality of authentication methods;
   forwarding the user to a home site associated with a third-party for the user to obtain a third-party security token;
   authenticating the user according to a designated authentication method selected by the user from the plurality of authentication methods, the authentication method performed using the third-party security token issued by a third-party that is administered separately from the enterprise network and presented to the enterprise network by the user; and
   providing secured access to the user upon confirmation of authentication.

2. The method of claim 1, wherein receiving a request comprises the user requesting access to a content site within the enterprise network.

3. The method of claim 1, further comprising fulfilling the request including obtaining and using the third-party security token.

4. The method of claim 1, further comprising fulfilling the request without obtaining and using the third-party security token.

5. The method of claim 1, further comprising querying the user as to which of a plurality of authentication methods is to be used for authentication of the user.

6. The method of claim 4, further comprising one of the user and a home site designating a third-party security token authentication method for use in authentication of the user.

7. The method of claim 4, further comprising forwarding the user to a home site to obtain the third-party security token for authentication.

8. The method of claim 1, wherein providing secured access comprises linking the user to the content site upon confirmation of authentication based on a direct mapping method.

9. The method of claim 8, wherein the direct mapping method comprises:
   identifying the user by searching and obtaining a key known at a home site and the content site; and
   upon verification of the authentication, linking the remote user to a secondary profile hosted at the content site.

10. The method of claim 1, wherein providing secured access comprises linking the user to the content site upon confirmation of authentication based on an indirect mapping method.

11. The method of claim 10, wherein the indirect mapping method comprises:
   identifying the user by searching and obtaining a key known at the content site;
   receiving at least one user entry corresponding to identification of the user; and
   upon verification of the authentication, linking the remote user to a secondary profile hosted at the content site.

12. The method of claim 1, wherein providing secured access comprises linking the user to the content site upon confirmation of authentication based on a user registration method.

13. In a network environment, a method for providing secured access, comprising:
   receiving a request from a user for secured access to an enterprise network;
   in response to the request, interacting with the user to provide the user with an offering of a plurality of authentication methods;
   authenticating the user according to a designated authentication method selected by the user from the plurality of authentication methods, the authentication method performed using a security token issued by a third-party that is administered separately from the enterprise network; and providing secured access to the user upon confirmation of authentication;
wherein providing secured access comprises linking the user to the content site upon confirmation of authentication based on a user registration method; and
wherein the user registration method comprises:
the user presenting the third-party security token to the content site;
processing the third-party security token to verify its source;
mapping the user to a default directory entry;
presenting a form to the user prompting collection of information about the user; and
upon verification of the authentication, linking the remote user to a secondary profile hosted at the content site.

14. The method of claim 1, wherein the third-party security token comprises at least one of a SAML assertion, a Passport token, and an alternate third-party security token.

15. The method of claim 1, wherein providing secured access comprises:
mapping the third-party security token presented by the user into a directory entry local to the enterprise network; and
implementing rules-based access control at the enterprise network based upon the content of the third-party security token;
wherein mappings are created based on at least one of a user DN present in the third-party security token and attribute values carried in the third-party security token.

16. In a network environment, a system for providing secured access, comprising:
an enterprise network receiver for receiving a request for secured access from a user;
an authenticator operable to:
interact with the user, in response to the receiving the request, to provide the user with an offering of a plurality of authentication methods; and
forward the user to a home site associated with a third-party for the user to obtain a third-party security token;
authenticate the user according to a designated authentication method selected by the user from the plurality of authentication methods, the designated authentication method performed using the third-party security token issued by a third-party that is not the enterprise network and presented to the enterprise network by the user; and
an access provider for providing secured access to the user upon confirmation of authentication.

17. The system of claim 16, wherein the request is directed to access a content site within the enterprise network.

18. The system of claim 16, wherein the system is configured to fulfill the request by including obtaining and using the third-party security token.

19. The system of claim 16, wherein the system is configured to fulfill the request without obtaining and using the third-party security token.

20. The system of claim 16, wherein secured access comprises a link of the user to the content site upon confirmation of authentication based on a direct mapping method.

21. The system of claim 16, wherein secured access comprises a link of the user to the content site upon confirmation of authentication based on an indirect mapping method.

22. The system of claim 16, wherein secured access comprises a link of the user to the content site upon confirmation of authentication based on a user registration method.

23. The system of claim 16, wherein the third-party security token comprises at least one of a SAML assertion, a Passport token, and an alternate third-party security token.

24. The system of claim 16, wherein secured access comprises rules-based access control at the enterprise network based upon the content of the third-party security token.

25. The system of claim 16, wherein mappings are created based on at least one of a user DN present in the third-party security token and attribute values carried in the third-party security token.

26. A medium for use in a network environment on an electronic device, the medium holding instructions executable using the electronic device for performing a method of providing secured access, the method comprising:
receiving a request from a user for secured access to an enterprise network;
in response to the request, interacting with the user to provide the user with an offering of a plurality of authentication methods;
forwarding the user to a home site associated with a third-party for the user to obtain a third-party security token;
authenticating the user according to a designated authentication method selected by the user from the plurality of authentication methods, the authentication method performed using the third-party security token issued by a third-party that is not the enterprise network and presented to the enterprise network by the user; and
providing secured access to the user upon confirmation of authentication.

27. The medium of claim 26, wherein receiving a request comprises the user requesting access to a content site within the enterprise network.

28. The medium of claim 26, further comprising fulfilling the request including obtaining and using the third-party security token.

29. The medium of claim 26, further comprising fulfilling the request without obtaining and using the third-party security token.

30. The medium of claim 26, further comprising querying the user as to which of a plurality of authentication methods is to be used for authentication of the user.

31. The medium of claim 29, further comprising one of the user and a home site designating a third-party security token authentication method for use in authentication of the user.

32. The medium of claim 29, further comprising forwarding the user to a partner site to obtain the third-party security token for authentication.

33. The medium of claim 26, wherein providing secured access comprises linking the user to the content site upon confirmation of authentication based on a direct mapping method.

34. The medium of claim 33, wherein the direct mapping method comprises:
identifying the user by searching and obtaining a key known at a home site and the content site; and
upon verification of the authentication, linking the remote user to a secondary profile hosted at the content site using the key.

35. The medium of claim 26, wherein providing secured access comprises linking the user to the content site upon confirmation of authentication based on an indirect mapping method.

36. The medium of claim 35, wherein the indirect mapping method comprises:
identifying the user by searching and obtaining a key known at the content site;

receiving at least one user entry corresponding to identification of the user; and upon verification of the authentication, linking the remote user to a secondary profile hosted at the content site.

37. The medium of claim 26, wherein providing secured access comprises linking the user to the content site upon confirmation of authentication based on a user registration method.

38. The medium of claim 37, wherein the user registration method comprises:

the user presenting the third-party security token to the content site;

processing the third-party security token to verify its source;

mapping the user to a default directory entry;

presenting a form to the user prompting collection of information about the user; and upon verification of the authentication, linking the remote user to a secondary profile hosted at the content site.

39. The medium of claim 26, wherein the third-party security token comprises at least one of a SAML assertion, a Passport token, and an alternate third-party security token.

40. The medium of claim 26, wherein providing secured access comprises:

mapping the third-party security token presented by the user into a directory entry local to the enterprise network; and implementing rules-based access control at the enterprise network;

wherein mappings are created based on at least one of a user DN present in the third-party security token and attribute values carried in the third-party security token.

41. The method of claim 1, wherein the user-designated authentication method comprises a user selection of an authentication site.

42. The system of claim 16, wherein the user-designated authentication method comprises a user selection of an authentication site.

43. The medium of claim 26, wherein the user-designated authentication method comprises a user selection of an authentication site.

44. The method of claim 12, wherein the user registration method comprises:

the user presenting the third-party security token to the content site;

processing the third-party security token to verify its source;

mapping the user to a default directory entry;

presenting a form to the user prompting collection of information about the user; and upon verification of the authentication, linking the remote user to a secondary profile hosted at the content site.

* * * * *